United States Patent [19]

Hillier et al.

[11] 4,181,313
[45] Jan. 1, 1980

[54] SEALS AND GASKETS

[75] Inventors: Edward F. H. B. Hillier, Cheltenham; Robin A. Walker, Winchcombe, both of England

[73] Assignee: Dowty Seals Limited, Tewkesbury, England

[21] Appl. No.: 787,922

[22] Filed: Apr. 15, 1977

[30] Foreign Application Priority Data

Apr. 30, 1976 [GB] United Kingdom ............... 17631/76
Mar. 8, 1977 [GB] United Kingdom ................. 9796/77

[51] Int. Cl.² ............................................. F16J 15/10
[52] U.S. Cl. .................................... 277/166; 277/180; 277/235 B
[58] Field of Search ............... 277/227, 228, 166, 180, 277/235 B

[56] References Cited

U.S. PATENT DOCUMENTS

| 2,538,198 | 1/1951 | Hosford | 277/166 |
| 3,653,673 | 4/1972 | Green | 277/227 |
| 3,664,676 | 5/1972 | Petersen | 277/166 |
| 3,775,204 | 11/1973 | Thompson et al. | 277/228 |
| 3,794,333 | 2/1974 | Czernik et al. | 277/180 |
| 4,026,565 | 5/1977 | Jelinek | 277/180 |

Primary Examiner—Robert I. Smith
Attorney, Agent, or Firm—Young & Thompson

[57] ABSTRACT

A seal or gasket having at least one aperture providing a fluid passageway and intended in use to be clamped by clamping means between surfaces of two parts to be sealed. The seal or gasket comprises conformable elastically-compressible material and relatively-incompressible material bonded therein. The relatively-incompressible material forms an extrusion-limiting barrier which extends at least part-way around the aperture, which is interrupted at intervals by portions of the elastically-compressible material and which is spaced from the aperture by a border portion wholly of the elastically-compressible material.

10 Claims, 15 Drawing Figures

SEALS AND GASKETS

This invention relates to seals and gaskets.

In order to prevent leakage of fluid between confronting surfaces of two parts which are connectible together by clamping means, for example bolts, it is necessary to place a seal or gasket between the two surfaces and to compress the seal or gasket by tightening the clamping means.

A problem hitherto experienced with such seals and gaskets has been that when, in use, they are subjected to fluid pressures, for example those prevailing in an associated fluid passageway and applied to the seals and gaskets in a direction parallel to their two faces, those fluid pressures may cause extrusion of the material of the seals and gaskets, giving rise to the formation of leakage paths from the respective fluid passageway across the said faces.

Another problem hitherto experienced with such seals and gaskets has been the inadvertent destructive compression which has occurred, during clamping together of the parts, at those regions of the seals and gaskets (for example, those regions surrounding bolt holes) upon which clamping forces are most concentrated. Such destructive compression has taken place because the material of the seals or gaskets at these regions has been unable to resist such clamping forces as are necessary to ensure sealing over a wide range of operating pressures and temperatures. Thus it has been desirable for seals and gaskets to be of a form embodying compression stop means in order to resist over-compression thereof during clamping between two surfaces. In some cases the compression stop means have taken the form of metal frameworks or, alternatively, inserts tightly fitting in respective apertures formed in the seals or gaskets.

According to this invention a seal or gasket, which has at least one aperture providing a fluid passageway and which is intended in use to be clamped by clamping means between surfaces of two parts to be sealed, comprises conformable elastically-compressible material and relatively-incompressible material bonded therein, said relatively-incompressible material forming an extrusion-limiting barrier which extends at least part-way around said aperture, which is interrupted at intervals by portions of said elastically-compressible material and which is spaced from said aperture by a border portion wholly of said elastically-compressible material.

The total volume of the relatively-incompressible material of said barrier may be substantially greater than the total volume of the elastically-compressible material forming the interrupting portions in the barrier.

The extrusion-limiting barrier is intended to limit extrusion of the elastically-compressible material of said border portion under fluid pressure which prevails in said aperture in use of the seal or gasket and which is applied to that material in the direction parallel to the faces of the seal or gasket.

The barrier may be so positioned in said elastically-compressible material as to extend away for a certain distance from a clamping-hole (as herein defined) and have an effective boundary, in plan, whose distance from the edge of said aperture increases as the distance from said clamping-hole increases. The elastically-compressible material may have a thickness between said edge and said boundary which, in the free state of the seal or gasket, is greater than that of the relatively-incompressible material and which, along said certain distance, increases as the distance from said clamping-hole increases.

The extrusion-limiting barrier may include discrete volumes of said relatively-incompressible material which are substantially of wedge shape in plan, of keystone shape, of rectangular shape, of part-annular shape, or any combination thereof, depending upon the particular application of the seal or gasket and on the shape of the respective aperture.

Certain parts of said barrier may form compression stop means for resisting destructive compression of the seal or gasket during the clamping together of said two parts. Also, further compression stop means of said relatively-incompressible material may, in certain of said seals or gaskets, be provided in association with a said clamping-hole and separately from said barrier.

The term "clamping-hole" is intended to include (i) an aperture provided in the seal or gasket through which clamping means can pass, (ii) a scalloped portion extending inwardly of the seal or gasket from an edge thereof to provide for the passage of clamping means, and, (iii) a region of the seal or gasket upon which clamping forces are concentrated when the seal or gasket is compressed by clamping means applied externally to said parts to be sealed.

The said certain distance by which the relatively-incompressible material extends away from said clamping-hole will be a distance predetermined in dependence upon the particular application intended for the seal or gasket.

Preferably the elastically-compressible material is of foamed form.

The seal or gasket may be provided, on at least one face thereof, with a bead of elastically-compressible material at least part-way around said aperture.

Also according to the invention there is provided a seal or gasket, which has at least one aperture providing a fluid passageway and which is intended in use to be clamped by clamping means between surfaces of two parts to be sealed, comprising conformable elastically-compressible material and, bonded therein, material which is relatively-incompressible and which extends away from a clamping-hole for a certain distance with an effective boundary, in plan, whose distance from the edge of the aperture increases as the distance from the clamping-hole increases, the seal or gasket being produced by a deposition technique whereby the conformable elastically-compressible material, in the free state of the seal or gasket, has a thickness which, between said edge and said boundary, is greater than that of the relatively-incompressible material and which, along said certain distance, increases as the distance from the clamping-hole increases.

Also according to the invention there is provided a method of producing a seal or gasket of the form set forth in the fifth paragraph herein, said method comprising (a) depositing, upon a base, in an uncured or partially-cured state and to a predetermined height or heights, volumes of said relatively-incompressible material intended to form said extrusion-limiting barrier, (b) curing or partially-curing said volume so deposited, (c) depositing, upon said base, in an uncured or partially-cured state and to a predetermined height or heights, said conformable elastically-compressible material, and, (d) curing or partially-curing said conformable elastically-compressible material so deposited, so that it becomes bonded to said relatively-incompressible material.

The said method may further include the step of applying a deposit of elastically-compressible material to said seal or gasket at least part-way around said aperture, followed by the step of curing that deposit, thereby to form a bead of elastically-compressible material disposed adjacent said aperture.

The depositing of said elastically-compressible material and the depositing of said relatively-incompressible material are preferably effected by screen-printing.

The said base may be of a material which is water-soluble, and, following curing of the relatively-incompressible material and of the elastically-compressible material, the assembly is immersed in water to effect parting of the seal or gasket from the base. Alternatively, the seal or gasket may be retained upon the base so that the base forms part of the finished seal or gasket.

Also according to the invention there is provided a method of producing a seal or gasket, which is intended in use to be clamped by clamping means between surfaces of two parts to be sealed and which has an aperture providing a fluid passageway, said method comprising (a) depositing, upon a base, in an uncured or partially-cured state and to a predetermined height or heights, volumes of a first and relatively-incompressible material intended to form an extrusion-limiting barrier extending at least part-way around said aperture, (b) curing or partially-curing said volumes so deposited, (c) depositing, upon said base, in an uncured or partially-cured state and to a predetermined height or heights, a second and conformable elastically-compressible material, and, (d) curing or partially-curing said second material so deposited, so that it becomes bonded to said first material, the deposition of said materials being such that portions of said second material interrupt said barrier at intervals and such that said barrier is spaced from said aperture by a border portion formed wholly of said second material.

By the term "conformable elastically-compressible material" herein used is meant a material which has good sealing characteristics whereby the material has conformability with the surfaces to be associated with the seals and gaskets, and by "material which is relatively-incompressible" is meant a material which, compared with said conformable elastically-compressible material, has inferior sealing characteristics but has a high modulus of elasticity whereby its resistance to creep over a wide range of environmental conditions is high.

Five embodiments of the invention will now be particularly described by way of example with reference to the accompanying drawings, of which, FIG. 14 shows in plan part of a gasket in accordance with the fourth embodiment, and, FIG. 15 shows in plan part of a gasket in accordance with the fifth embodiment.

Figure 1:
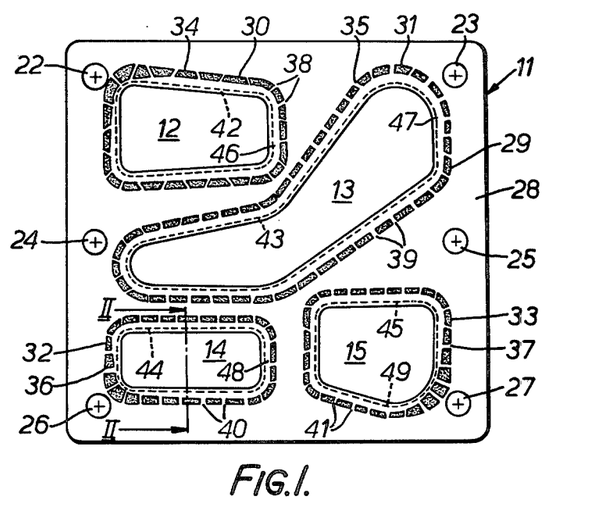
FIG. 1 shows in plan a gasket in accordance with the first embodiment.
Figure 2:
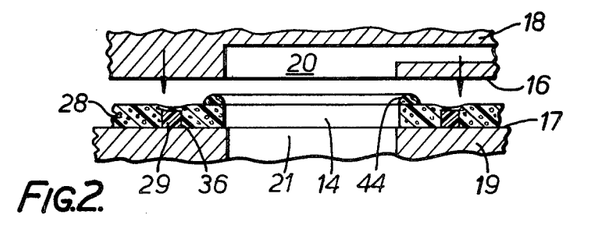
FIG. 2 is an enlarged cross-section taken along the line II—II on FIG. 1.

With reference to FIGS. 1 and 2, the gasket 11 shown is provided with four apertures 12, 13, 14 and 15, which provide fluid passageways, and is intended to be placed between surfaces 16 and 17 of two parts 18 and 19 adapted to be secured together by clamping means in the form of bolts (not shown). The apertures 12 to 15 are shaped to conform to mating openings, such as openings 20 and 21 associated with the aperture 14, formed in the parts 18 and 19 respectively. The gasket is intended to seal around these openings. A plurality of clamping-holes 22, 23, 24, 25, 26 and 27 are provided in the gasket for the passage of the bolts from the part 18 to the part 19.

The gasket is formed partly of conformable elastically-compressible material 28, in this embodiment a foamed epoxy resin, and partly of relatively-incompressible material 29, in this embodiment a hardened polyester resin loaded with a reinforcing filler comprising solid glass particles. The material 29 which is bonded to the material 28 comprises a plurality of discrete volumes as at 30, 31, 32 and 33.

The volumes 30 together form an extrusion-limiting barrier 34 extending around the aperture 12, and likewise the volumes 31, 32 and 33 form extrusion-limiting barriers 35, 36 and 37 respectively extending around the apertures 13, 14 and 15. Thus each barrier comprises relatively-incompressible material which is interrupted at intervals by portions, as at 38, 39, 40 and 41 respectively, of elastically-compressible material, these portions being within the two boundaries, in plan, of each barrier.

As shown in FIG. 1, certain of the volumes 30 to 33 are of rectangular shape in plan, while some are of keystone shape and others of wedge shape.

Continuous beads 42, 43, 44 and 45 of elastically-compressible material are provided on the upper surface of the gasket, closely surrounding the respective apertures 12 to 15. Thus these beads are respectively carried upon border portions 46, 47, 48 and 49 wholly of said elastically-compressible material which respectively space the barriers 34 to 37 from the edges of those apertures.

When, in use of the apparatus to which the gasket is fitted, fluid under pressure is introduced into the mating openings, as at 20 and 21, the volumes of material 29 forming the barriers 34 to 37 are effective to limit extrusion of the elastically-compressible material disposed between the respective barrier and the aperture, which might occur under the fluid pressure which is applied to that material in a direction parallel to the upper and lower faces of the gasket.

The keystone shapes and the wedge shapes of the discrete volumes of material 29, particularly those in the vicinity of the radiussed portions of the apertures 12 to 15, provide for greater limitation of such extrusion of the material 28 because here each volume is effectively wedged between its two adjacent volumes to resist the fluid pressures which prevail in the respective apertures.

The discrete volumes 30 of the barrier 34 around the aperture 12 are all of wedge shape in plan and in the alternating pattern shown.

In certain parts of the barriers the discrete volumes also form compression stop means for resisting destructive compression of the gasket, during clamping together of the parts 18 and 19, such as in the manner later described with reference to FIGS. 7 to 13. In particular and for this purpose, those discrete volumes of the barriers 34, 36 and 37 which are disposed in the vicinity of the clamping-holes 22, 26 and 27 are, as shown in FIG. 1, arranged with an effective boundary, in plan, whose distance from the edge of the respective aperture increases as the distance from the respective clamping-hole increases.

Figure 3:
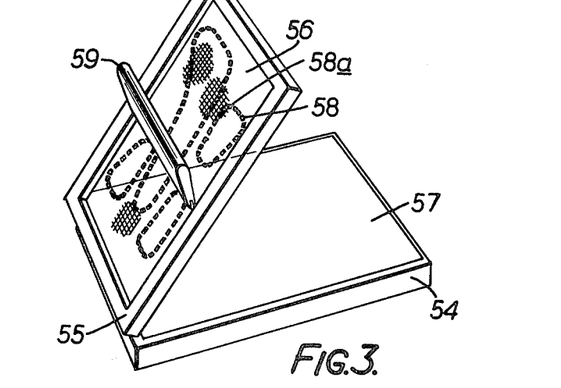
FIG. 3 is a diagrammatic perspective view of an apparatus suitable for producing the gasket of FIGS. 1 and 2.
Figure 4:
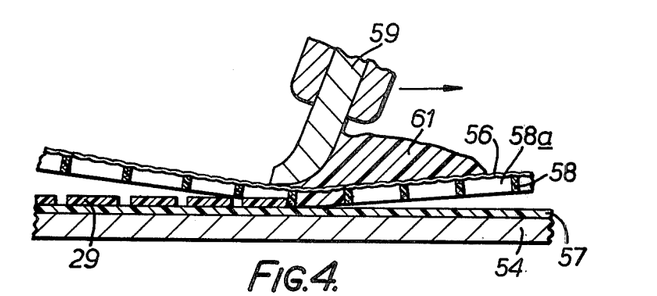
FIG. 4 is a section of part of the apparatus shown in FIG. 3, illustrating one process step.
Figure 5:
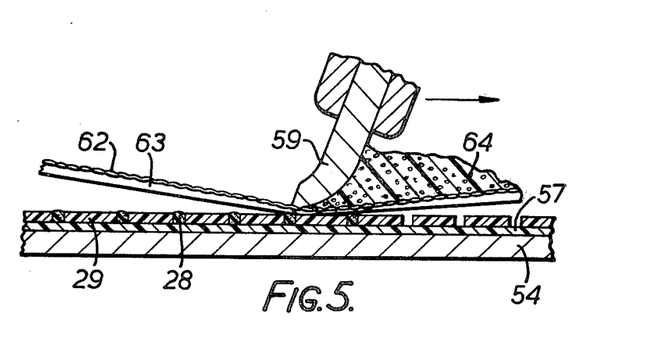
FIG. 5 is a section similar to that of FIG. 4 but showing another process step.

The gasket of FIGS. 1 and 2 is produced by the use of apparatus shown in FIGS. 3, 4 and 5. This apparatus is of the screen-type and comprises a bed 54 having a frame 55 hingedly mounted on one edge thereof. The frame carries a tightly-stretched foraminous screen 56 formed of woven nylon filaments. The bed supports a base 57 of water-soluble fibrous material and a stencil 58 is secured to the underside of the screen. The stencil has a distribution of apertures 58a therein corresponding to the required shape, in plan, of the volumes of the material 29 to be arranged as interrupted barriers around the apertures 12, 13, 14 and 15 of the gasket 11. A squeegee-like implement 59 is provided in association with the frame 55 and when the frame is closed down, the screen 56 and the stencil 58 are positioned a predetermined distance above the base 57.

In using the apparatus for producing a gasket such as that shown in FIGS. 1 and 2, a quantity 61 of the polyester resin material 29 intended for the relatively-incompressible volumes is placed in the uncured state above the screen 56. The screen and stencil are pressed down as shown in FIG. 4 by the implement 59 and the latter is then used to spread the polyester resin over the screen. The action of the implement is to force the polyester resin through the screen and also through the apertures in the stencil on to the base 57 to a predetermined height. The screen and stencil are then raised, leaving the deposits of polyester resin on the base in the shapes and in the arrangement required by the stencil.

The deposition is satisfactorily achieved because the polyester resin has such thixotropic characteristics that when it is in its condition for deposition it is capable of a limited amount of flow under the action of surface tension and gravity, but since it is then of a pasty nature, once deposited it does not substantially deform from its shape as deposited, so that areas of the base are left free of this material.

The bed 54, carrying the base 57 together with the pieces of polyester resin so deposited, is placed in a hot air blast oven (not shown) being then subjected to a predetermined elevated temperature for a predetermined period of time, whereby the volumes of polyester resin are hardened.

The bed 54, carrying the base 57 together with the now-cured and thus substantially-rigid and relatively-incompressible volumes 30 to 33 of polyester resin 29, is then removed from the oven.

As shown in FIG. 5, another screen 62, similar to screen 56, and another stencil 63 having apertures corresponding to the required profile of the gasket, as well as providing for the apertures 12 to 15 and the clamping-holes 22 to 27, are, upon the frame 55 being closed down, positioned a predetermined distance above the base 57. A quantity 64 of the conformable elastically-compressible material 28, in this embodiment an epoxy resin containing a foaming agent in the form of benzene sulphone hydrazide, is placed in the uncured state upon the screen 62. The screen 62 and stencil 63 are then pressed down by the implement 59 and the latter is then used to spread the epoxy resin over the screen. The resin is in consequence forced through the screen, being deposited upon the base 57 to substantially the same height as the cured volumes of the material 29 and in the overall gasket plan shape required by the stencil.

Thereafter the bed 54, carrying the base 57 together with the deposits thereon, is again placed in the hot air blast oven and the material 28 is cured by subjection to a predetermined elevated temperature for a predetermined period of time. During curing, due to the presence of the foaming agent, the epoxy resin becomes cellular in character and stands proud of the upper surfaces of the material 29 as shown in FIG. 2, a film of the cellular material thereafter covering the upper surfaces of the discrete volumes of material 29. Also during curing, these volumes and the material 28 become bonded together.

The bed 54, carrying the base 57 together with the two materials 28 and 29, is then removed from the oven.

Finally, by the use of another screen and stencil, epoxy resin including a foaming agent and intended to form the beads 42 to 45, is deposited, in the desired shape and to a predetermined height, on the border portions 46 to 49 of material 28. The bed 54, together with the base 57 and its deposits, is then placed in the oven and the deposits to form the beads 42 to 45 are cured, becoming cellular in character.

The bed 54 is thereafter removed from the oven and the base 57, together with deposits, is removed from the bed. The base, with deposits, is finally immersed in water and because it is water-soluble it becomes parted from the deposits.

The gasket thus formed by the cured deposits is thereafter placed between the two parts 18 and 19 shown in FIG. 2. As these parts are clamped together by the clamping means, the beads 42 to 45 seal around the edges of the respective openings, such as 20 in the part 18, and as clamping progresses the materials 28 and 29 together resist compression substantially in parallel.

Figure 6:
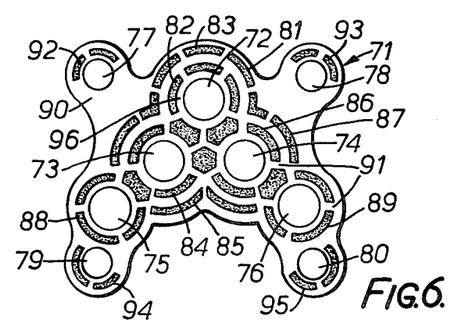
FIG. 6 shows in plan a gasket in accordance with the second embodiment.

With reference to the embodiment shown in FIG. 6 of the drawings, the gasket 71 has five apertures 72 to 76 which provide fluid passageways, and four clamping-holes 77 to 80 for the passage of clamping means such as bolts.

The apertures 72, 73 and 74 have an overlapping pattern, in plan, of discrete volumes of relatively-incompressible material 81. These volumes are mainly of part-annular shape in plan and certain of them effectively form double, concentric, extrusion-limiting barriers extending in the manner shown around each of these apertures as at 82/83, 84/85, 86/87 respectively. The barriers 83, 85 and 87 effectively back up the barriers 82, 84 and 86 in their extrusion-limiting function. The apertures 75 and 76 have discrete volumes of relatively-incompressible material 81 around them which effectively form single barriers 88 and 89. As shown the barriers of adjacent apertures merge into one another so that certain of the discrete volumes are common to adjacent barriers.

As with the gasket of FIGS. 1 and 2, the remainder of the gasket is formed of elastically-compressible material 90 and the barriers are interrupted at intervals by portions, as at 91, of the elastically-compressible material 90 confined within the two boundaries, in plan, of each of the barriers.

In the vicinity of the clamping-holes 77 to 80 the gasket is provided with discrete volumes 92 to 95 of the relatively-incompressible material 81 which are so shaped as to form compression stop means for resisting destructive compression of the gasket during clamping together of the two parts associated with the gasket.

The arrangement of the volumes of material 81 forming the barriers 82 to 89 and the particular shapes, in plan, of these volumes, are such as to afford adequate limitation of extrusion of the border portions, as at 96, wholly of material 90 and adjacent the apertures 72 to 76, under fluid pressure applied to that material from those apertures.

The gasket of FIG. 6 is produced by a method similar to that employed in the production of the gasket of FIGS. 1 and 2.

As with the gasket of FIGS. 1 and 2 the discrete volumes of the extrusion-limiting barriers may, in certain parts of the barriers themselves, also form compression stop means for resisting destructive compression of the gasket during clamping together of the associated parts.

Figure 7:
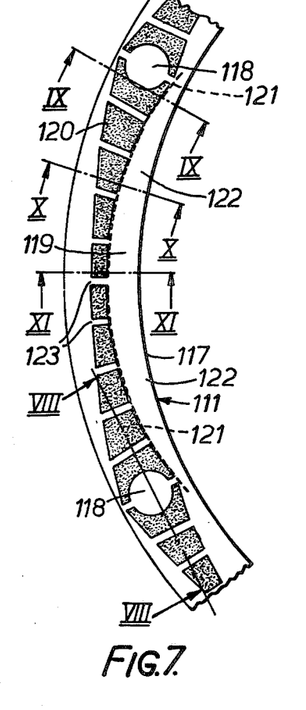
FIG. 7 shows in plan part of a gasket in accordance with the third embodiment.
Figure 8:
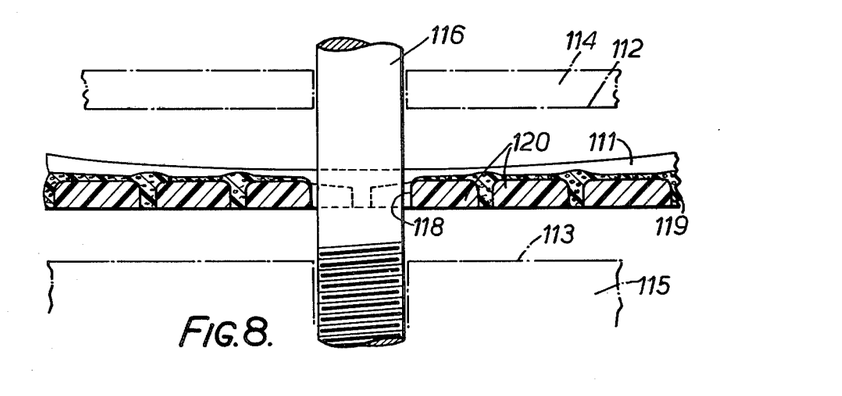
FIG. 8 is an enlarged cross-section taken along the line VIII—VIII on FIG. 7.
Figure 11:
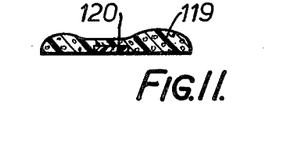
FIG. 11 is an enlarged cross-section taken along the line XI—XI on FIG. 7.
Figure 12:
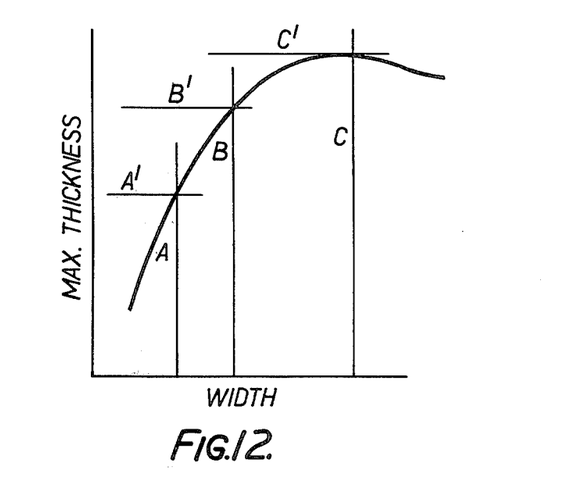
FIG. 12 is a graphical representation of dimensional relationships of portions of the gasket of FIGS. 7 to 11.
Figure 13:
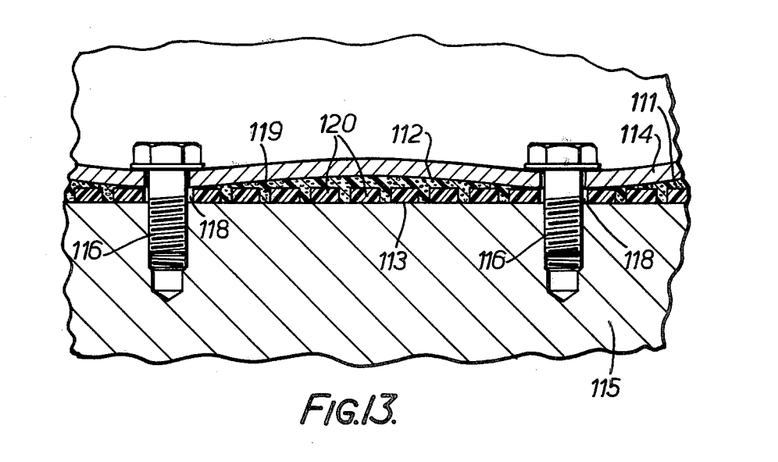
FIG. 13 is a cross-section showing part of the finished gasket of FIGS. 7 to 11 under compression between two surfaces.

With reference to the third embodiment shown in FIGS. 7 to 13 of the drawings, the gasket 111 is of annular form and is intended to be placed between surfaces 112 and 113 of two parts 114 and 115 adapted to be secured together by clamping means in the form of bolts, shown at 116 in FIGS. 8 and 13. The gasket is required to seal around mating circular openings in the parts 114 and 115 and is provided with an aperture 117 conforming with those openings. A plurality of clamping-holes 118 are provided in the gasket for the passage of the bolts 116 from the part 114 to the part 115. The gasket is formed partly of conformable elastically-compressible material 119, comprising a foamed epoxy resin, and partly of relatively-incompressible material 120, in the form of hardened polyester resin loaded with a reinforcing filler comprising solid glass particles.

The material 120, which is bonded to the material 119, comprises a plurality of volumes spaced apart and progressively tapering in plan in a direction away from a respective clamping-hole 118 in the manner shown in FIG. 7. The material 120 extends from each clamping-hole for a certain distance, in this embodiment to a position approximately half-way between adjacent clamping holes, with an effective boundary 121, in plan, whose distance from the edge of the aperture 117 increases as the distance from the respective clamping-hole 118 increases. The gasket is produced in a manner similar to those of the previous embodiments, and it is ensured that in its free state the material 119 has a thickness, as indicated by FIG. 7 taken in conjunction with the cross-sections of FIGS. 8 to 11, which, between the edge of the aperture 117 and the boundary 121, is greater than that of the material 120 and which along the said certain distance increases as the distance from the clamping-hole increases.

Figure 9:
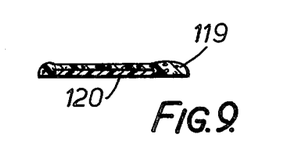
FIG. 9 is an enlarged cross-section taken along the line IX—IX on FIG. 7.
Figure 10:
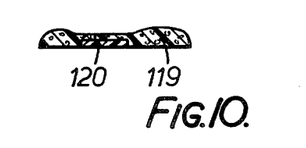
FIG. 10 is an enlarged cross-section taken along the line X—X on FIG. 7.

FIG. 12 graphically shows dimensional relationships of the material 119 and the material 120 by plotting maximum thicknesses of the material 119 against widths of the border portion of that material between the edge of the aperture 117 and the boundary 121, the relationships produced at the cross-sections of FIGS. 9, 10 and 11 being indicated by the lines A, A'; B, B'; and C, C' respectively.

As with the gaskets of the first and second embodiments, the volumes of the material 120 together form an extrusion-limiting barrier interrupted at intervals, by portions of material 119 as at 123, and spaced from the edge of the aperture 117 by the border portion, as at 122, wholly of material 119.

During the production of the gasket of FIGS. 7 to 13, the thixotropic characteristics of the epoxy resin and the nature of the foaming agent are such that in dependence upon the different shapes of the material 120 surrounded, in plan, by the material 119, in dependence upon the thickness of the material 120, and in dependence upon the spacing of the material 120 from the aperture 117, differences in surface tension occur in the material 119. These differences result in the changes in contour and thickness of the material 119 across the gasket as illustrated in FIGS. 8 to 12.

Thus the gasket of FIGS. 7 to 13 is provided with compression stops, formed by the volumes of material 120, bonded in a matrix of the material 119. When the gasket is placed between the surfaces 112 and 113 of the two parts 114 and 115, and the bolts 116 are tightened, the gasket is clamped in the manner shown in FIG. 13. During initial clamping the material 119 solely resists compression. Thereafter that material and the material 120 together resist compression substantially in parallel.

The compression stops so formed resist destructive compression of the gasket as clamping progresses, the larger of the volumes of material 120 being disposed as shown in FIG. 7 adjacent to the clamping-holes 118, and thus in the region of the most-concentrated clamping forces to afford the highest resistance to those forces. Whilst the material 120 thereby affords desired resistance to destructive compression of the gasket, the material 119 ensures sealing where really required in the gasket, in particular around the border portion 122 of the aperture 117. Further the material 119, by virtue of its increase in thickness as the distance from each clamping-hole increases, seals against any likely bowing of the part 114 occurring during tightening of the bolts 116 and due to inherent flexibility of that part. The increase in thickness of the material 119 is predetermined for each specific gasket application so that the presence of an excess of material 119 between the surfaces 112 and 113 at designed clamping pressures, and attendant material extrusion, are avoided. Thus the necessary compression-resistance for each particular gasket application is predetermined by the shapes and/or patterns and thicknesses of the volumes of material 120 and the positional relationship of those volumes with respect to the aperture, with respect to the clamping-holes and with respect to one another. The necessary sealing characteristics are predetermined by the resultant thicknesses and contours of the material 120, which have regard to the physical nature of the parts intended to be clamped together with the gasket between them.

FIG. 13 shows in exaggerated manner a degree of bowing of the part 114, this having been accommodated by the gasket. However, but for the presence of the material 120 with a greater concentration thereof in the regions of the clamping-holes giving appreciable resistance to compression, more pronounced bowing of the part 114 might well have occurred, and this most likely would have resulted in a major sealing problem.

Figures 14, 15:
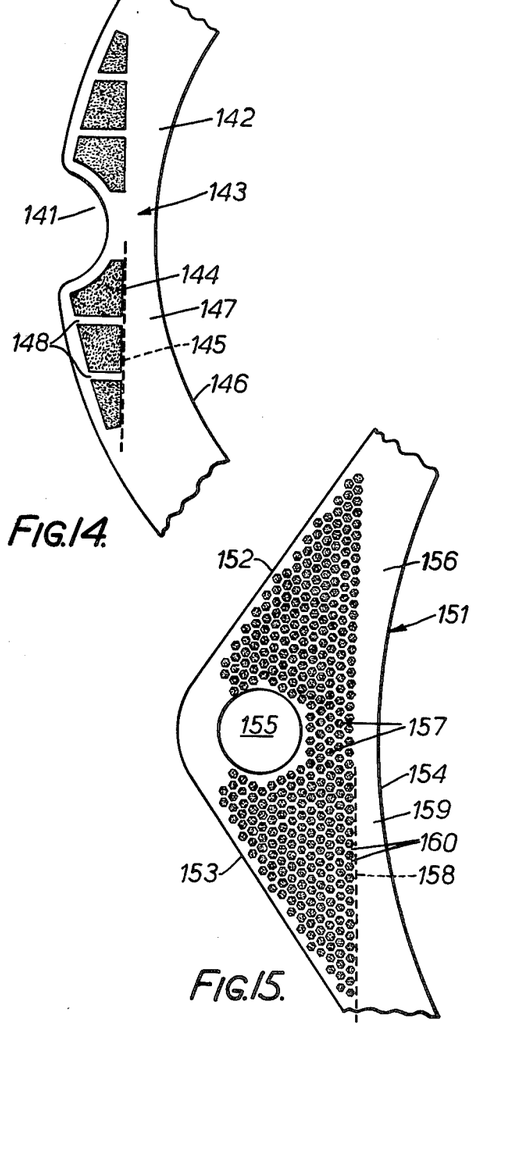

With reference to FIG. 14, the gasket of the fourth embodiment is of annular shape but each of a plurality of "clamping-holes" comprises a scalloped portion 141 in the conformable elastically-compressible material 142 extending inwardly of the outer peripheral edge of the gasket 143. The volumes of relatively-incompressible material 144 form both compression stops and an extrusion-limiting barrier which is interrupted at intervals by portions, as at 148, of the material 142. Being designed for different specific clamping considerations, these volumes do not extend as far away from the "clamping-holes" as those of FIGS. 7 to 11. The boundary 145 of the volumes is spaced from the edge of the aperture 146 by a border portion 147 wholly of elastically-compressible material 142 and the distance between said edge and said boundary increases as the distance from the "clamping-hole" 141 increases. Also the material 142 has a thickness which, between the edge of the aperture and the boundary, is greater than that of the material 144 and which increases as the distance from the "clamping-hole" increases.

With reference to FIG. 15, the gasket 151 of the fifth embodiment has straight external edges as at 152 and 153 and an aperture 154. The clamping-holes, one of which is shown at 155, formed in the elastically-compressible material 156, have volumes of relatively-incompressible material 157 extending away therefrom in the manner shown. The volumes are much smaller than those of FIGS. 7 and 14, being of hexagonal shape in plan and effectively forming a plurality of barriers interrupted at intervals by portions, as at 160, of elastically-compressible material. The pattern of volumes is intended to meet different specific clamping considerations from those of FIGS. 7 and 14. Again, the distance of the boundary 158 from the edge of the aperture 154 increases as the distance from the clamping-hole increases and the material 156 has a thickness which, between the edge of the aperture 154 and the boundary 158, is greater than that of the material 157 and which increases as the distance from the clamping-hole increases.

As with the previous embodiments, the barrier arrangement is spaced from the edge of the aperture 154 by a border portion 159 wholly of elastically-compressible material and affords means for limiting extrusion of that portion under fluid pressure applied thereto. As is the case with all the embodiments, the setting up of undesirable leakage paths across the gasket is in consequence avoided.

In each of the above-described embodiments the total volume of the relatively-incompressible material of each extrusion-limiting barrier is substantially greater than the total volume of the elastically-compressible material confined within the two boundaries, in plan, of each barrier and forming the interrupting portions. However, in other embodiments the converse may be the case, or again, these total volumes may be substantially equal.

The invention is not limited to the shapes or arrangement, in plan, of the discrete volumes of relatively-incompressible material forming the barriers of the embodiments above-described with reference to the drawings, as in other embodiments these volumes may be of other suitable shapes or arrangement in plan, depending upon the particular application of the respective gaskets and the fluid pressures likely to be experienced, to give desired extrusion-limitation of the elastically-compressible material of the gasket adjacent the respective apertures and, where appropriate, desired resistance to destructive compression of the elastically-compressible material during clamping together of the associated parts.

Although in the embodiments above-described with reference to the drawings the bases upon which the gaskets are produced are discarded on completion of the gaskets, in alternative embodiments the bases are retained to form part of the finished gaskets. In this case it would be necessary to cut apertures in the bases as necessary to correspond with those in the elastically-compressible material.

Again, although in the embodiments above-described with reference to the drawings, the bases upon which the gaskets are produced are water-soluble, in other embodiments and where it is not required to maintain the bases as part of the finished gaskets, the materials may be deposited upon coatings of polytetrafluoroethylene, or other suitable release agent, laid on suitable bases, which will facilitate parting of the finished gaskets from the bases following curing.

In certain applications, as well as forming sealing devices, the gaskets may form shims of predetermined thickness for placing between two parts to space them one from the other by a desired critical amount.

The invention is not limited to the method of producing gaskets above referred to as in other embodiments the relatively-incompressible material may be only partially-cured following deposition, being fully-cured simultaneously with curing of the elastically-compressible material.

Further, the elastically-compressible material may, in other embodiments, be one which does not become cellular in character upon curing.

Again, in other embodiments, deposition of the material may be affected by a method other than screen-printing, for example, an intaglio method or a method using nozzle means.

Although in the embodiments above-described with reference to the drawings the relatively-incompressible material and the elastically-compressible material are deposited in the uncured state, in alternative embodiments one of these materials, or both of them, may be deposited in a partially-cured state.

The provision of the said extrusion-limiting barriers with said interrupting portions disposed at intervals enables the gaskets to be handled with less likelihood of the relatively-incompressible material of the barriers cracking than would have been the case with uninterrupted barriers of that material. This is because any folding of the gaskets which might take place can now occur across the interrupting portions.

We claim:

1. A seal or gasket, which has at least one aperture providing a fluid passageway and which has at least one clamping location, disposed at a predetermined position thereon, at which said seal or gasket in use can be clamped, by clamping means, between surfaces of two parts to be sealed, said seal or gasket comprising conformable elastically-compressible non-metallic material and a plurality of discrete volumes of relatively-incompressible non-metallic material which are so disposed in and bonded to the elastically-compressible non-metallic material that they are closely-spaced one from another by portions of said elastically-compressible non-metallic material and together form an extrusion-limiting barrier, interrupted at intervals by said portions, which extends at least part-way around said aperture and which is spaced from said aperture by a border portion wholly of said elastically-compressible non-metallic material.

2. A seal or gasket as claimed in claim 1, wherein the total volume of the relatively-incompressible material of said barrier is substantially greater than the total volume of the elastically-compressible material forming the interrupting portions in the barrier.

3. A seal or gasket as claimed in claim 1, wherein said barrier is so positioned in said elastically-compressible material as to extend away for a certain distance from said clamping location and have an effective boundary, in plan, whose distance from the edge of said aperture increases as the distance from said clamping-hole increases.

4. A seal or gasket as claimed in claim 3, wherein said elastically-compressible material has a thickness between said edge and said boundary which, in the free state of the seal or gasket, is greater than that of the relatively-incompressible material and which, along said certain distance, increases as the distance from said clamping-location increases.

5. A seal or gasket as claimed in claim 3, wherein certain parts of said barrier form compression stop means for resisting destructive compression of the seal or gasket during the clamping together of said two parts.

6. A seal or gasket as claimed in claim 5, wherein further compression stop means of said relatively-incompressible material are provided in association with a said clamping-location and separately from said barrier.

7. A seal or gasket as claimed in claim 1, wherein said discrete volumes of said relatively-incompressible material are substantially of wedge shape in plan.

8. A seal or gasket as claimed in claim 1, wherein said elastically-compressible material is of foamed form.

9. A seal or gasket as claimed in claim 1, and having, on at least one face thereof, a bead of elastically-compressible material at least part-way around said aperture.

10. A seal or gasket, which has at least one aperture providing a fluid passageway and which has at least one clamping location, disposed at a predetermined position thereon, at which said seal or gasket in use can be clamped, by clamping means, between surfaces of two parts to be sealed, said seal or gasket comprising conformable elastically-compressible non-metallic material and a plurality of discrete volumes of relatively-incompressible non-metallic material which are so disposed in and bonded to the elastically-compressible non-metallic material that they are closely-spaced one from another by portions of said elastically-compressible non-metallic material and together form an extrusion-limiting barrier, interrupted at intervals by said portions, which extends away from said clamping location for a certain distance and which is spaced from said aperture by a border portion wholly of said elastically-compressible non-metallic material, and said barrier having an effective boundary, in plan, whose distance from the edge of the aperture increases as the distance from said clamping location increases, the seal or gasket being produced by a deposition technique whereby the conformable elastically-compressible non-metallic material, in the free state of the seal or gasket, has a thickness which, between said edge and said boundary, is greater than that of the relatively-incompressible non-metallic material and which, along said certain distance, increases as the distance from said clamping location increases.

* * * * *